（12）United States Patent
Hertel et al.

(10) Patent No.: US 10,407,072 B2
(45) Date of Patent: Sep. 10, 2019

(54) SYSTEM AND METHOD OF REGULATING WHEEL SLIP IN A TRACTION VEHICLE

(71) Applicant: Deere & Company, Moline, IL (US)

(72) Inventors: Benjamin J. Hertel, S. Coffeyville, OK (US); Clayton G. Janasek, Independence, KS (US)

(73) Assignee: DEERE & COMPANY, Moline, IL (US)

( * ) Notice: Subject to any disclaimer, the term of this patent is extended or adjusted under 35 U.S.C. 154(b) by 947 days.

(21) Appl. No.: 14/845,182

(22) Filed: Sep. 3, 2015

(65) Prior Publication Data

US 2017/0066447 A1 Mar. 9, 2017

(51) Int. Cl.
| | |
|---|---|
| *B60W 30/18* | (2012.01) |
| *B60K 28/16* | (2006.01) |
| *B60W 10/02* | (2006.01) |
| *B60W 10/06* | (2006.01) |

(Continued)

(52) U.S. Cl.
CPC ..... *B60W 30/18172* (2013.01); *B60K 28/165* (2013.01); *B60W 10/02* (2013.01); *B60W 10/06* (2013.01); *E02F 9/2079* (2013.01); *E02F 9/2253* (2013.01); *B60W 2300/17* (2013.01); *B60W 2510/0241* (2013.01); *B60W 2520/26* (2013.01); *B60W 2710/023* (2013.01); *B60W 2710/027* (2013.01); *B60W 2710/0644* (2013.01); *B60W 2710/105* (2013.01); *B60Y 2200/411* (2013.01)

(58) Field of Classification Search
None
See application file for complete search history.

(56) References Cited

U.S. PATENT DOCUMENTS

| | | |
|---|---|---|
| 3,913,680 A | 10/1975 | Carlson |
| 4,037,544 A | 7/1977 | Cantone |
| 4,157,118 A | 6/1979 | Suganami et al. |
| (Continued) | | |

FOREIGN PATENT DOCUMENTS

| | | |
|---|---|---|
| DE | 1937314 | 2/1971 |
| DE | 3017570 | 11/1981 |
| (Continued) | | |

OTHER PUBLICATIONS

Office Action from the US Patent and Trademark Office for U.S. Appl. No. 14/845,186 dated Jan. 27, 2017 (11 pages).

(Continued)

*Primary Examiner* — Colby M Hansen
(74) *Attorney, Agent, or Firm* — Michael Best & Friedrich LLP

(57) ABSTRACT

A vehicle traction control system for a vehicle, in which the vehicle has a prime mover, at least one wheel for providing tractive effort on a support surface, and a transmission having an input side operably coupled to the prime mover and an output side operably coupled to the at least one wheel, and in which the transmission has a controllable clutch pressure between the input side and the output side, includes a controller operable to monitor wheel slip of the at least one wheel. When wheel slip is detected the controller is operable to control the clutch pressure for modulating an output torque of the transmission for reducing the wheel slip. The clutch pressure can be controlled as a function of clutch slip.

19 Claims, 5 Drawing Sheets

(51) Int. Cl.
*E02F 9/20* (2006.01)
*E02F 9/22* (2006.01)

(56) References Cited

U.S. PATENT DOCUMENTS

| | | | |
|---|---|---|---|
| 4,177,870 A | 12/1979 | Henn | |
| 4,518,044 A | 5/1985 | Wiegardt et al. | |
| 4,846,283 A | 7/1989 | Batcheller | |
| 5,002,147 A * | 3/1991 | Tezuka | B60K 23/0808 180/197 |
| 5,147,010 A | 9/1992 | Olson et al. | |
| 5,265,705 A * | 11/1993 | Takasugi | B60K 28/165 180/197 |
| 5,303,794 A * | 4/1994 | Hrovat | B60K 28/165 180/197 |
| 5,505,267 A | 4/1996 | Orbach et al. | |
| 5,564,507 A | 10/1996 | Matsushita et al. | |
| 5,613,581 A | 3/1997 | Fonkalsrud et al. | |
| 5,684,691 A | 11/1997 | Orbach et al. | |
| 5,755,291 A | 5/1998 | Orbach et al. | |
| 5,911,769 A | 6/1999 | Orbach et al. | |
| 6,119,786 A | 9/2000 | Creger et al. | |
| 6,144,910 A | 11/2000 | Scarlett et al. | |
| 6,162,146 A | 12/2000 | Hoefling | |
| 6,234,254 B1 | 5/2001 | Dietz et al. | |
| 6,317,676 B1 | 11/2001 | Gengler et al. | |
| 6,405,844 B1 * | 6/2002 | Takamatsu | B60K 28/165 192/103 F |
| 6,487,998 B1 * | 12/2002 | Masberg | B60L 7/003 123/192.1 |
| 6,846,268 B2 * | 1/2005 | Schmitt | B60K 28/165 180/197 |
| 6,857,494 B2 | 2/2005 | Kobayashi et al. | |
| 7,452,306 B2 | 11/2008 | Casey | |
| 7,734,398 B2 | 6/2010 | Manneppalli | |
| 7,770,681 B2 | 8/2010 | Marathe et al. | |
| 7,779,947 B2 | 8/2010 | Stratton | |
| 7,867,136 B2 | 1/2011 | Schifferer | |
| 7,974,756 B2 | 7/2011 | Ikari | |
| 8,060,284 B2 | 11/2011 | Hendryx | |
| 8,083,004 B2 | 12/2011 | Knight, Jr. | |
| 8,103,417 B2 | 1/2012 | Gharsalli et al. | |
| 8,175,785 B2 | 5/2012 | Turski et al. | |
| 8,540,048 B2 | 9/2013 | Will et al. | |
| 8,600,621 B2 | 12/2013 | Callaway et al. | |
| 8,626,404 B2 | 1/2014 | Thomson et al. | |
| 8,726,543 B2 | 5/2014 | Kelly | |
| 8,788,160 B2 | 7/2014 | Lorentz et al. | |
| 8,825,314 B2 | 9/2014 | Jensen | |
| 8,880,301 B2 | 11/2014 | Velde | |
| 8,983,739 B2 | 3/2015 | Faivre | |
| 9,086,104 B2 | 7/2015 | McCann et al. | |
| 9,213,331 B2 | 12/2015 | Johnson et al. | |
| 9,845,008 B2 * | 12/2017 | Brownell | B60K 28/16 |
| 9,994,104 B2 * | 6/2018 | Hertel | B60K 28/16 |
| 2001/0056319 A1 | 12/2001 | Rocke | |
| 2003/0121674 A1 | 7/2003 | Scarlett et al. | |
| 2004/0006957 A1 | 1/2004 | Owens | |
| 2006/0042838 A1 | 3/2006 | Yeoman et al. | |
| 2006/0245896 A1 | 11/2006 | Alshaer et al. | |
| 2006/0287792 A1 | 12/2006 | Jarrett | |
| 2008/0234901 A1 | 9/2008 | Johnson et al. | |
| 2008/0234902 A1 | 9/2008 | Johnson et al. | |
| 2008/0257569 A1 | 10/2008 | Foster et al. | |
| 2008/0257570 A1 | 10/2008 | Keplinger et al. | |
| 2009/0223215 A1 | 9/2009 | Kelly et al. | |
| 2010/0009806 A1 | 1/2010 | Shirao et al. | |
| 2010/0174454 A1 | 7/2010 | Saito | |
| 2010/0300711 A1 | 12/2010 | Pirotais | |
| 2012/0133202 A1 | 5/2012 | Mui et al. | |
| 2012/0239260 A1 | 9/2012 | Ishikawa et al. | |
| 2012/0293316 A1 | 11/2012 | Johnson et al. | |
| 2013/0085036 A1 | 4/2013 | Anderson | |
| 2013/0103273 A1 | 4/2013 | von Schönebeck et al. | |
| 2013/0158804 A1 | 6/2013 | Callaway et al. | |
| 2013/0173122 A1 | 7/2013 | Liu et al. | |
| 2013/0289832 A1 | 10/2013 | Pirotais | |
| 2014/0005899 A1 | 1/2014 | Byers et al. | |
| 2014/0039772 A1 | 2/2014 | Jensen | |
| 2014/0121911 A1 | 5/2014 | Davis et al. | |
| 2014/0200775 A1 | 7/2014 | Shirao | |
| 2014/0277966 A1 | 9/2014 | Kelly | |
| 2014/0343800 A1 | 11/2014 | Nelson | |
| 2015/0120103 A1 | 4/2015 | Keys, II et al. | |
| 2015/0139767 A1 | 5/2015 | Moriki et al. | |
| 2015/0149054 A1 | 5/2015 | Gentle et al. | |
| 2015/0233094 A1 | 8/2015 | Maiyur | |
| 2015/0233309 A1 | 8/2015 | Maiyur | |
| 2016/0032564 A1 | 2/2016 | Pinther, II et al. | |
| 2016/0160470 A1 | 6/2016 | Kishimoto et al. | |

FOREIGN PATENT DOCUMENTS

| | | |
|---|---|---|
| DE | 3230330 | 2/1984 |
| DE | 3604218 | 2/1987 |
| DE | 4316421 | 11/1994 |
| DE | 69030503 | 10/1997 |
| DE | 19939442 | 2/2001 |
| DE | 10351376 | 5/2004 |
| DE | 102014206234 | 10/2015 |
| EP | 0241748 | 10/1987 |
| EP | 0338141 | 10/1989 |
| EP | 0500403 | 8/1992 |
| EP | 2556735 | 2/2013 |
| GB | 1086662 | 10/1967 |
| GB | 2428755 | 2/2007 |
| JP | H0790879 | 4/1995 |
| JP | H7090879 | 4/1995 |

OTHER PUBLICATIONS

Final Office Action from the US Patent and Trademark Office for U.S. Appl. No. 14/845,190 dated Mar. 24, 2017 (7 pages).
Office Action from the US Patent and Trademark Office for U.S. Appl. No. 14/845,190 dated Nov. 29, 2016 (6 pages).
DE102016216649.2 Search Report from the German Intellectual Property Office dated Jul. 19, 2017 (13 pages, which includes a Statement of Relevance).
DE102016216587.9 Search Report from the German Intellectual Property Office dated May 10, 2017 (9 pages, which includes a Statement of Relevance).
DE102016216584.4 Search Report from the German Intellectual Property Office dated May 10, 2017 (9 pages, which includes a Statement of Relevance).
DE102016216588.7 Search Report from the German Intellectual Property Office dated May 16, 2017 (11 pages, which includes a Statement of Relevance).
Office Action from the US Patent and Trademark Office for U.S. Appl. No. 14/845,192 dated Jun. 8, 2017 (10 pages).
Office Action from the US Patent and Trademark Office for U.S. Appl. No. 14/845,192 dated Aug. 22, 2017 (6 pages).
Office Action from the US Patent and Trademark Office for U.S. Appl. No. 14/845,186 dated Jul. 27, 2017 (15 pages).
Office Action from the US Patent and Trademark Office for U.S. Appl. No. 14/845,186 dated Feb. 23, 2018 (20 pages).

* cited by examiner

SYSTEM AND METHOD OF REGULATING WHEEL SLIP IN A TRACTION VEHICLE

BACKGROUND

The present disclosure relates to regulating wheel slip in a traction vehicle.

When a traction vehicle, such as a motor grader, is in low traction conditions, too much wheel slip can cause the vehicle to become less productive and can also degrade the quality of the support surface under the wheel. Poor tractive conditions have previously been addressed by limiting the torque to an electric drive motor, by applying individual wheel brakes to a slipping wheel, and by applying hydrostatic torque drive systems and infinitely variable hydraulic drive torque limiting systems. Other reactions to wheel slip are typically in the hands of the operator.

SUMMARY

Providing a method of automatic traction control for reduced wheel slip will improve the quality of the support surface left behind the vehicle, improve vehicle productivity, assist novice vehicle operators, and reduce the workload of experienced vehicle operators.

In one aspect, the disclosure provides a vehicle traction control system for a vehicle having a prime mover, at least one wheel for providing tractive effort on a support surface, and a transmission having an input side operably coupled to the prime mover and an output side operably coupled to the at least one wheel. The transmission has a controllable clutch pressure between the input side and the output side. The traction control system includes a controller operable to monitor wheel slip of the at least one wheel. When wheel slip is detected the controller is operable to control the clutch pressure for modulating an output torque of the transmission for reducing the wheel slip.

In another aspect, the disclosure provides a vehicle fraction control system for a vehicle having a prime mover, at least one wheel for providing tractive effort on a support surface, and a transmission having an input side operably coupled to the prime mover and an output side operably coupled to the at least one wheel. The transmission has a controllable clutch pressure between the input side and the output side, and a clutch slip sensor is associated with the transmission. The traction control system includes a controller operable to monitor the clutch slip of the transmission and control the clutch pressure based on the clutch slip to modulate an output torque of the transmission for reducing wheel slip.

In another aspect, the disclosure provides a method of regulating wheel slip in a traction vehicle having a prime mover, at least one wheel for providing tractive effort on a support surface, and a transmission having an input side operably coupled to the prime mover and an output side operably coupled to the at least one wheel. The transmission has a controllable clutch pressure between the input side and the output side. The method includes monitoring wheel slip of the at least one wheel, and controlling the clutch pressure of the transmission when the wheel is in a slipping state to reduce the wheel slip.

In yet another aspect, the disclosure provides a method of regulating wheel slip in a traction vehicle having a prime mover, at least one wheel for providing tractive effort on a support surface, a transmission having an input side operably coupled to the prime mover and an output side operably coupled to the at least one wheel. The transmission has a controllable clutch pressure between the input side and the output side and a clutch slip sensor associated with the transmission. The method includes monitoring the clutch slip of the transmission, and controlling the clutch pressure based on the clutch slip to modulate an output torque of the transmission for reducing wheel slip.

In another aspect, the disclosure provides a vehicle traction control system for a vehicle having a prime mover, at least one wheel for providing tractive effort on a support surface, and a transmission having an input side operably coupled to the prime mover and an output side operably coupled to the at least one wheel. The transmission has a controllable clutch pressure between the input side and the output side. The traction control system includes a processor configured to monitor wheel slip of the at least one wheel, when the wheel slip is at or above a first threshold and below a second threshold reduce the clutch pressure for reducing the wheel slip, and when the wheel slip is at or above the second threshold, control the engine speed for reducing the wheel slip.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the accompanying drawings. The disclosure is capable of other embodiments and of being practiced or of being carried out in various ways.

Figure 1A:
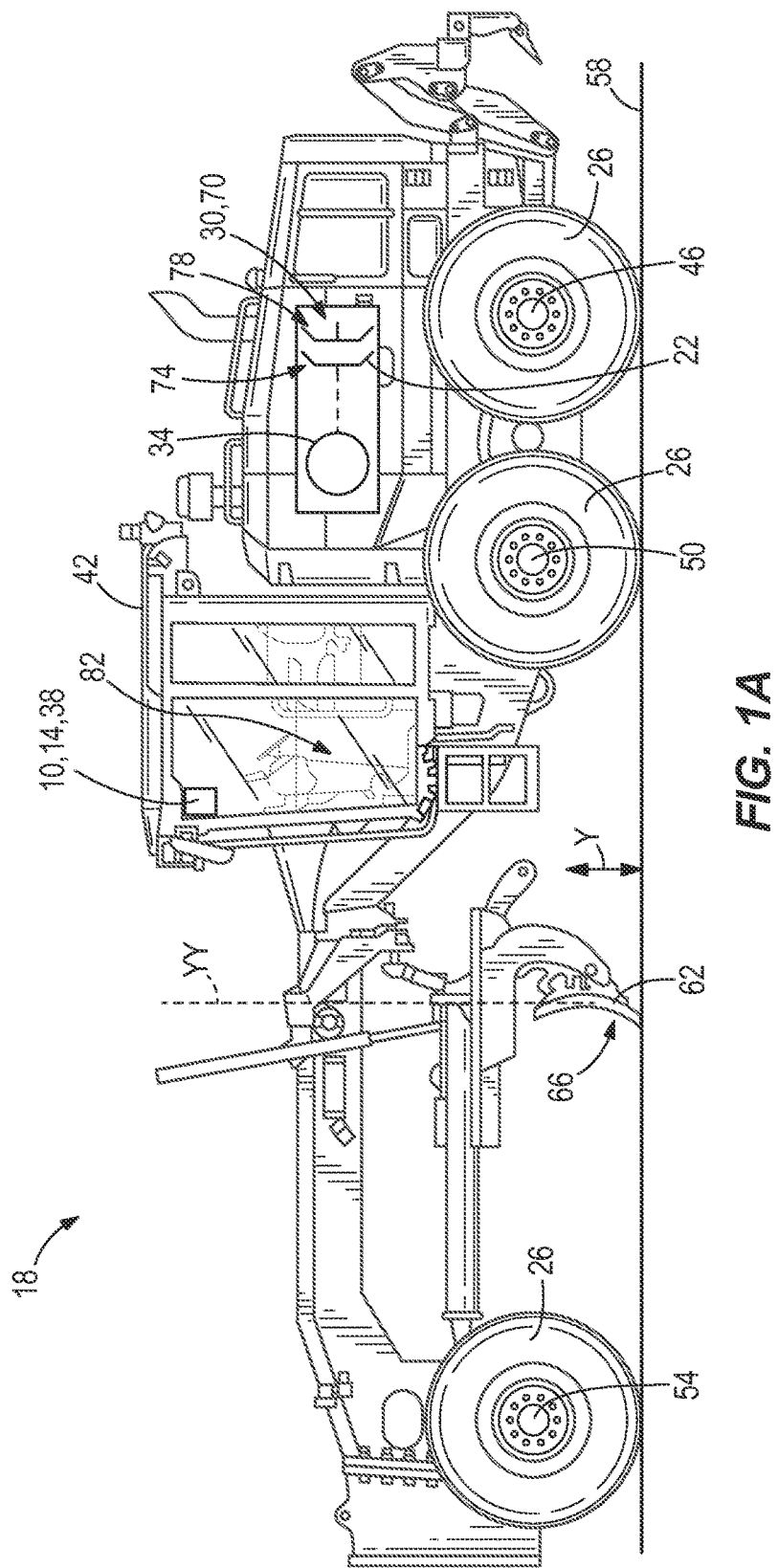
FIG. 1A is a traction vehicle with a traction control system in accordance with the present disclosure.
Figure 1B:
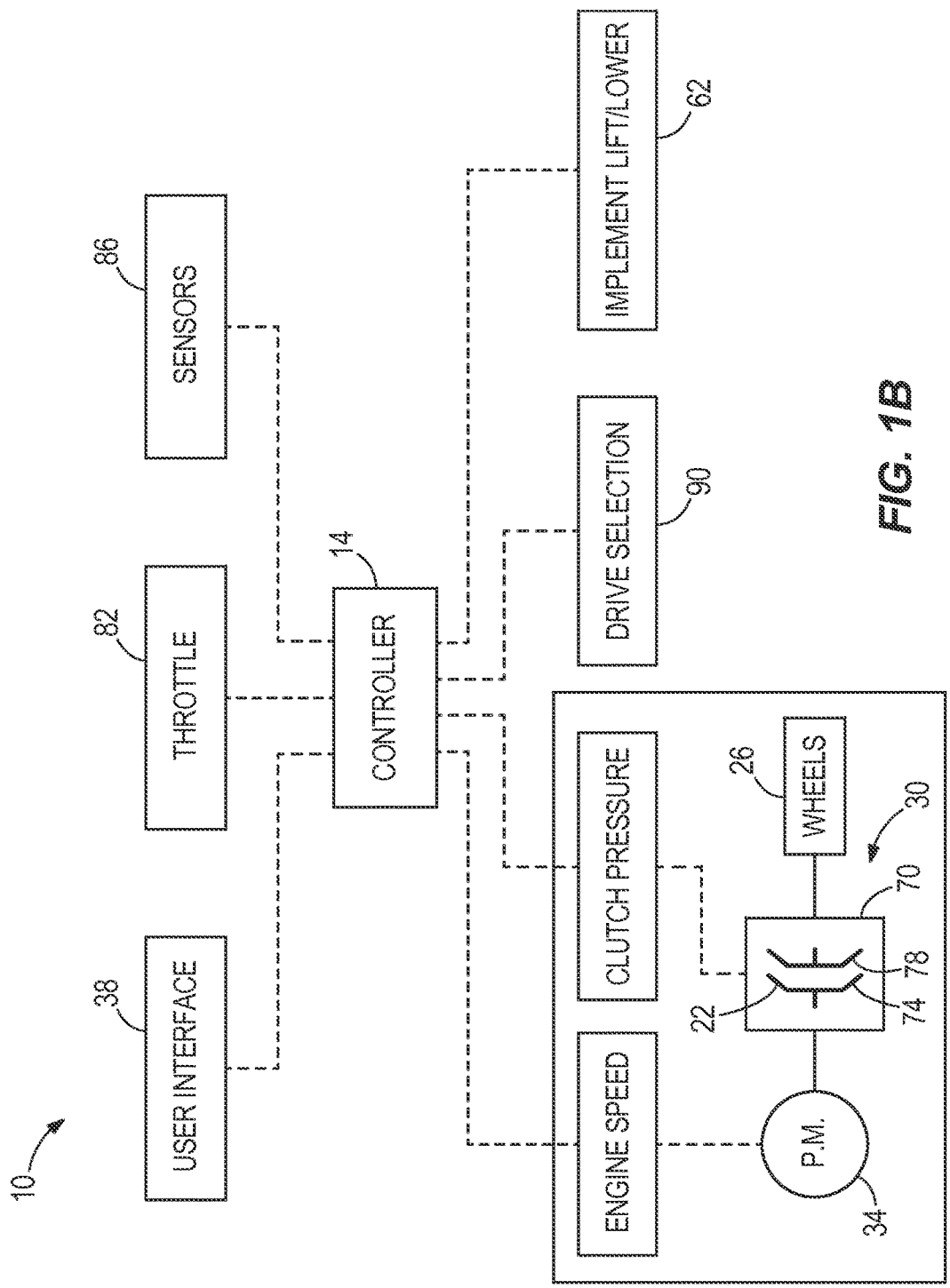
FIG. 1B is a schematic illustration of the traction control system for the traction vehicle of FIG. 1A.

A traction control system 10, illustrated schematically in FIG. 1B, having a controller 14 is described herein for a fraction vehicle 18. For example, the traction vehicle 18 may include a motor grader as shown in FIG. 1A. However, the traction control system 10 described herein is not limited in its application to motor graders and may be applied to other fraction vehicles. For example, the traction control system 10 can be used on vehicles such as but not limited to dirt moving equipment, snow removal equipment, sand moving equipment, forestry harvesting equipment, agricultural equipment, cargo moving equipment, mining equipment, on highway equipment, automotive vehicles, etc. The traction control system 10 can also be used on other vehicles equipped with a transmission containing a friction clutch or a clutch capable of slippage, as will be discussed in greater detail below.

By way of example, FIG. 1A illustrates the traction vehicle 18, e.g., a motor grader, having a plurality of axles 46, 50, 54 and a plurality of wheels 26, the axles and wheels driven by a drivetrain 30, which is driven by a prime mover 34. The traction vehicle 18 may have any number of axles and drive wheels. For example, the vehicle 18 may have a first axle 46, a second axle 50, a third axle 54, and six drive wheels 26 corresponding therewith, as illustrated. The drivetrain 30 may provide power to drive some or all of the wheels 26, e.g., only the rear wheels, both the front and rear wheels, etc. The drivetrain 30 may include a drive selection mechanism 90 to selectively drive the wheels such that a user may select which wheels are driven. For example, the rear wheels may normally be powered during normal operating conditions, and the front wheels may be selectively engaged to receive a portion of the transmission output torque from the rear wheels as desired. In other constructions, other wheels may be normally powered and selectively powered in any combination. The vehicle 18 may include wheels 26 having tires, continuous tracks, or other traction devices that engage a support surface 58 (e.g., the ground). The drive wheels 26 interact directly with the support surface 58 and are responsible for vehicle 18 movement and tractive effort.

The illustrated traction vehicle 18 includes an implement 62, such as a blade, located between the second and third axles 50, 54. The implement 62 is a ground engaging tool. For example, the blade scrapes the support surface 58 to flatten the support surface 58 during a grading operation. The implement 62 may include other implements such as a ripper, a scarifier, a front attachment, a plough, a sweeper, a shovel, etc., and the vehicle 18 may include one or more of said implements. The implement 62 may be located in front of the forward-most axle (e.g., the third axle 54), behind the rearward-most axle (e.g., the first axle 46), or in between other axles. In yet other constructions, the traction vehicle 18 may include two or more implements 62 in these or other locations in any combination. The implement 62 is configured for movement generally up and down with respect to the support surface 58, e.g., in a direction Y generally normal to the support surface 58, towards and away from the support surface 58. Such movement is generally referred to herein as lift (away from the support surface 58) and lower (towards the support surface 58). The implement 62 may also include a pivot along a vertical axis YY (e.g., normal to the support surface 58) for turning a face 66 of the implement 62 from the front towards the sides. For example, the implement 62 may be electrohydraulically controlled by the controller 14 or may be controlled by other suitable mechanisms.

The prime mover 34 may include any power source to provide rotational driveline power, which includes an input power to the drivetrain 30. For example, the prime mover 34 may include, but is not limited to, an internal combustion engine, a piston engine, a rotary engine, a hydraulic motor, a hydrostatic system, an electric motor, etc. The term "engine" used throughout this document (e.g., as in "engine speed") refers generally to the prime mover 34 and is not limited to an engine or any particular type of prime mover.

The drivetrain 30 includes a transmission 70, such as a single-speed or multi-speed transmission, or infinitely-variable transmission through direct coupling means, torque converter drives, hydrostatic drives, electric motor drives, or any other transmission known now or in the future to those having ordinary skill in the art. For the purpose of the examples used herein, a direct drive multi-speed transmission is used. However, application is not limited to a direct drive transmission system. The traction control system 10 can be applied to any power transmission system containing a friction element, or any other transmission system capable of slippage.

The transmission 70 includes an input side 74 and an output side 78 coupled through a plurality of gears and clutches 22 or other similar frictional elements capable of transmitting torque. The input side 74 receives the input power and converts the input power to an output power on the output side 78. For example, the output power from the output side 78 drives the drive wheels 26 and may be geared directly to the drive wheels 26. Generally speaking, frictional transmission, including one or more frictional clutches, frictionally couples the input side 74 to the output side 78 to transmit movement (e.g., rotation) and/or power from the input side 74 to the output side 78. For example, it may be desirable to bring the output side 78 up to the same speed as the input side 74. When the input side 74 and the output side 78 are at the same speed, there is no slippage, or clutch slip. A pressure, or clutch pressure, is applied to the frictional coupling and can be controlled by the controller 14 to selectively increase and decrease the friction (which is proportional to the clutch pressure) between the input side 74 and the output side 78, thereby controlling transmission torque. Controlling the clutch pressure and the engine speed can affect the amount of clutch slip. For example, in a pressure-applied spring released clutch, clutch pressure can be adjusted by way of a proportional valve, such as an electrohydraulic proportional valve. The controller 14 controls current to the valve such that the clutch pressure is adjusted proportional to the current. It should be understood that the clutch pressure may be controlled in other suitable ways, particularly where other types of transmissions are employed it should be apparent that other corresponding clutch pressure adjustment mechanisms can be used. For better efficiency, it may be desired, under normal operating conditions, to have as little clutch slip as possible between the input side 74 and the output side 78.

Referring again to FIGS. 1A and 1B, the traction vehicle 18 may have a user interface 38 for system operation, which may be located in a cab 42 of the fraction vehicle 18 or other location on the vehicle or remote from the vehicle (e.g., the user interface may be a personal portable device with wireless communication to the controller). The controller 14 receives input from the user interface 38, from a user-controlled throttle 82 to control engine speed, and from a plurality of sensors 86. The controller 14 also has outputs for controlling clutch pressure, engine speed, blade lift and lower, and power transmission drive selection 90 (e.g., to direct power to the rear wheels, the front wheels, all wheels, etc.). Thus, the controller 14 is operatively coupled to the transmission 70, the prime mover 34, the blade 62, and the drive selection 90.

The sensors 86 may include any sensors suitable for each application, including but not limited to a speed sensor such as a wheel speed sensor and/or a ground speed sensor, a clutch slip sensor including an input side speed sensor and an output side speed sensor, and a clutch temperature sensor (or transmission temperature sensor).

The ground speed sensor may include a radar mechanism, global positioning system (GPS) or other suitable linear speed measurement sensor. The ground speed sensor measures the speed of the traction vehicle 18 relative to the support surface 58 and sends a ground speed signal to the controller 14. The wheel speed sensor measures the speed of at least one wheel that is powered by the transmission 70 and sends a wheel speed signal to the controller 14. The wheel speed may include a rotational speed or a linear speed (e.g., a linear speed at which the wheel would be moving based on its rotational speed with no wheel slip). The input side speed sensor and the output side speed sensor may include rotational speed sensors or other suitable sensors. The controller 14 includes a processor for making calculations, comparisons, and executing logic described in further detail below.

The controller 14 can calculate wheel slip by comparing the wheel speed and the ground speed. As one example, the controller 14 may calculate a speed difference by subtracting the ground speed from the wheel speed (e.g., which may first be converted from a rotational wheel speed to a linear wheel speed as discussed above). The wheel slip may be measured in terms of a percentage, e.g., a percentage of the speed difference relative to wheel speed. When the wheel is not slipping, the wheel slip is 0%, and when the wheel is slipping completely without any traction at all, the wheel slip is 100%. In other constructions, the wheel slip may be quantified in other ways and expressed in other units, such as but not limited to an absolute speed difference between ground speed and wheel speed.

As another example, the controller 14 can determine clutch slip by comparing the input side 74 speed from the input side speed sensor (e.g., the engine speed) to the output side 78 speed of the transmission 70 from the output side speed sensor. The controller 14 may calculate a clutch delta (rotational slip) by subtracting the output side speed from the input side speed. The clutch slip may be measured by the clutch delta (rotational speed difference) or in terms of a percentage, e.g., a percentage of clutch delta relative to the input speed. In other constructions, the clutch slip may be quantified in other ways and expressed in other units.

As described below in further detail, during low fraction conditions when wheel slipping occurs, or occurs above the threshold, it may be desirable to control clutch slip to regain wheel traction, e.g., by automatically controlling the clutch pressure and/or the engine speed. The present disclosure including the traction control system 10 describes methods of automatically managing wheel tractive effort.

Figure 2:
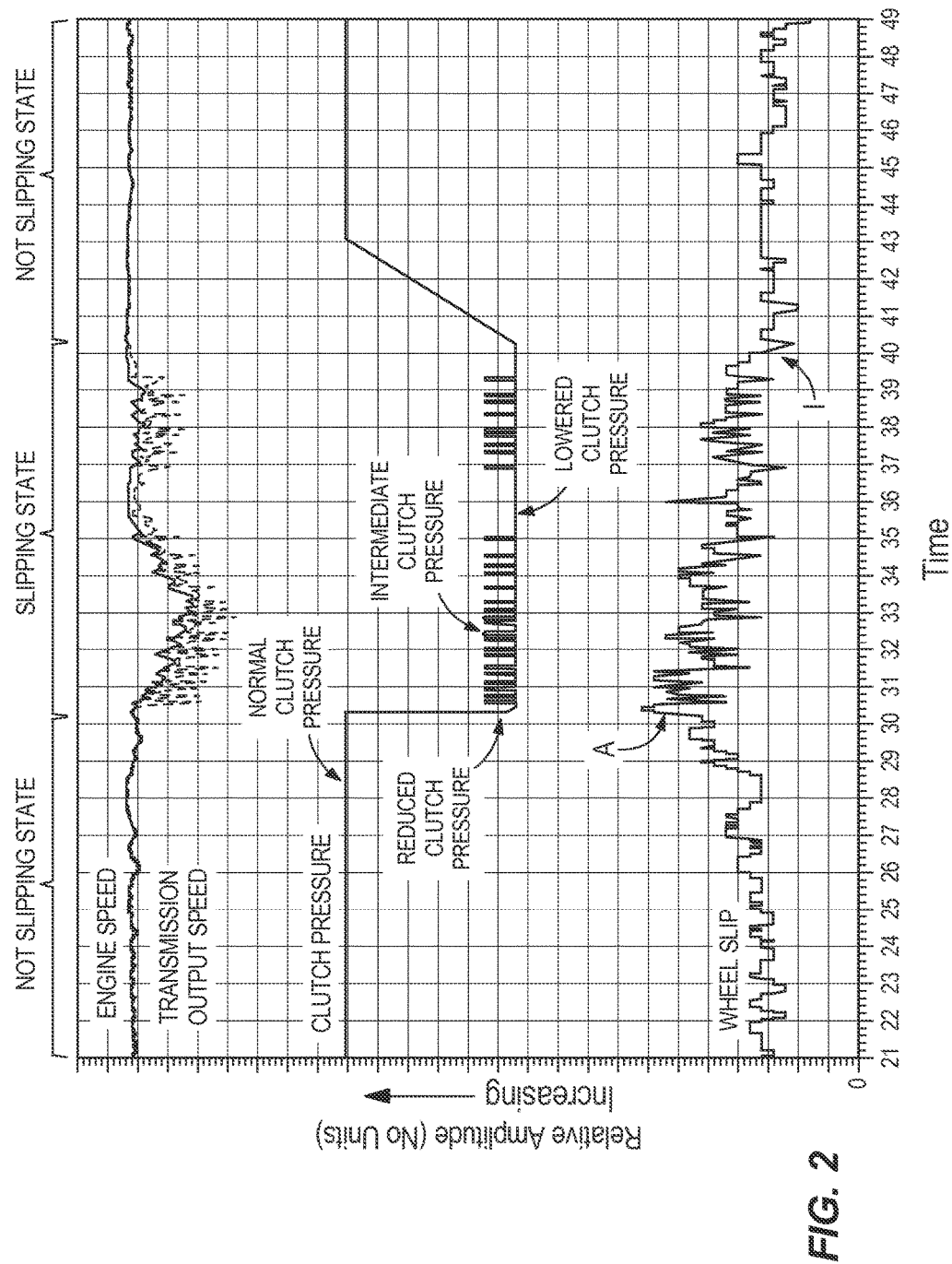
FIG. 2 is a plot of engine speed, transmission output speed, clutch pressure, and wheel slip over time illustrating the not slipping state and the slipping state.
Figure 3:
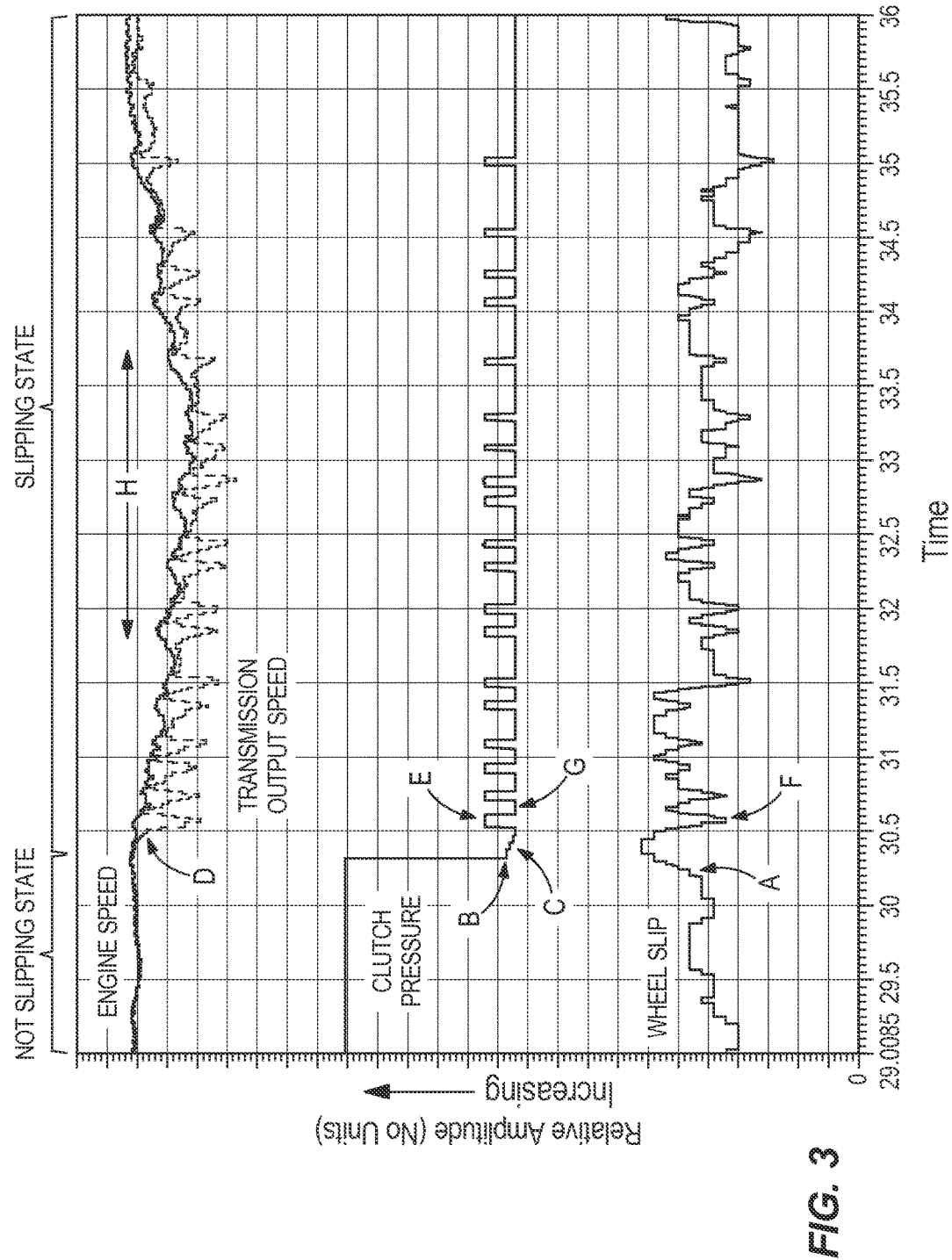
FIG. 3 is an enlarged view of a portion of the plot of FIG. 2.
Figure 4:
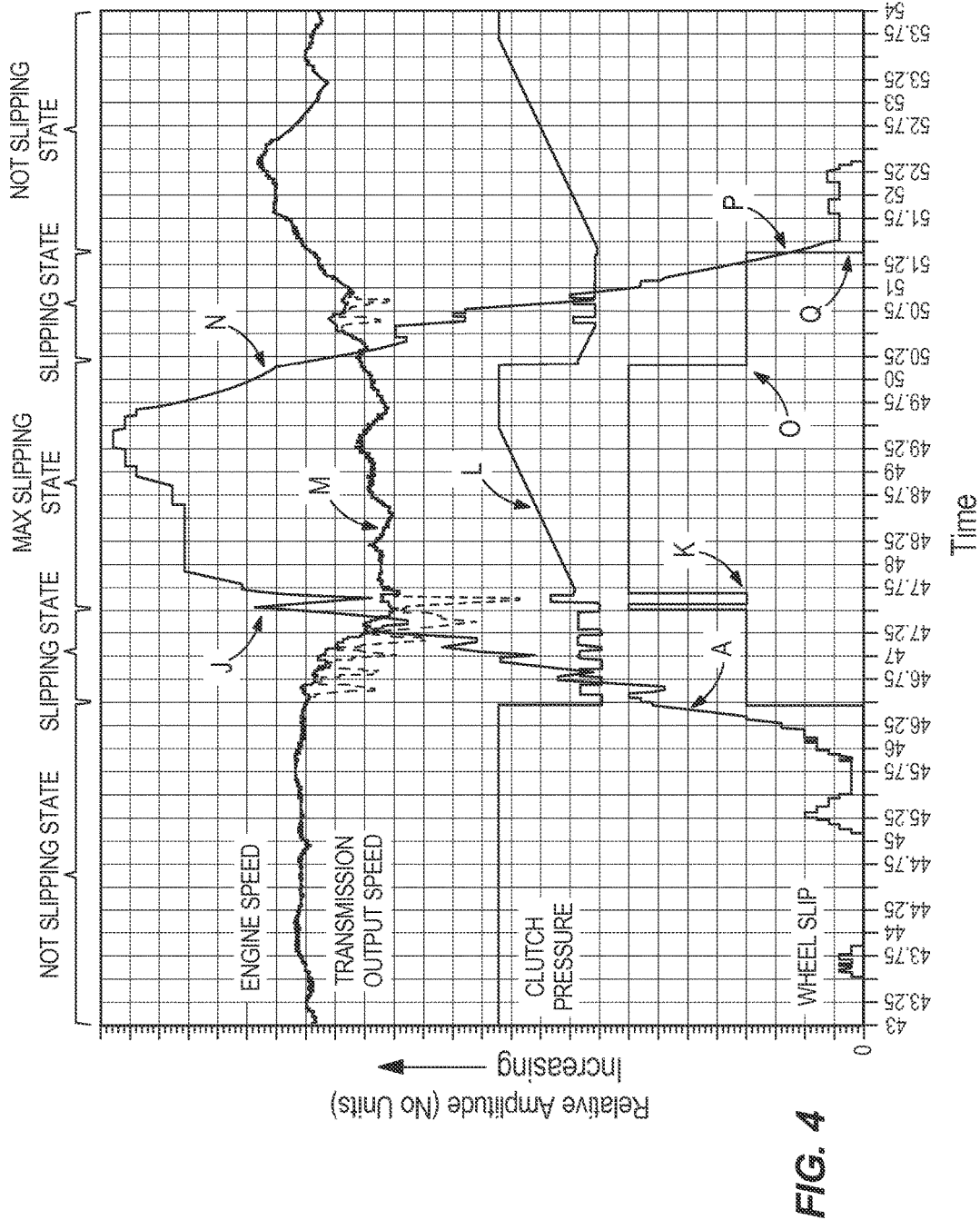
FIG. 4 is a plot of engine speed, transmission output speed, clutch pressure, and wheel slip over time illustrating the not slipping state, the slipping state, and the max slipping state.

In operation, and with reference specifically to one or more of those wheels 26 being powered by the transmission 70, the one or more wheels 26 have three states of possible operation: 1) slipping, 2) max slipping, and 3) not slipping. The controller 14 continuously monitors wheel slip and determines which state the one or more wheels 26 are in, as described below. FIGS. 2-3 illustrate one example of operation from the not slipping state to the slipping state and back to the not slipping state, and is not to be regarded as limiting. FIG. 4 illustrates an example of operation from the not slipping state to the slipping state to the max slipping state, then returning to the slipping state, and then finally returning to the not slipping state, and is not to be regarded as limiting.

Under normal operating conditions, when no wheel slip is detected, the system 10 is in the not slipping state. The system 10 is typically in the not slipping state when the traction vehicle 18 begins operation and is under normal operating conditions throughout use. In the not slipping state, the wheels 26 are not slipping at all (e.g., 0% wheel slip), and may have a small, acceptable amount of slipping, which is tolerable and does not rise to the level of requiring system intervention to regain traction. The tolerable amount of slipping may be a predetermined threshold level of slipping, or slipping threshold, programmed into the controller 14 as a threshold level triggering entrance into the slipping state, described in greater detail below.

As illustrated in the examples of FIGS. 2-4, during the not slipping state when the wheels 26 have proper traction on the support surface 58 and there is no wheel slip or only a small amount of wheel slip below the slipping threshold, the system 10 operates normally and a predetermined normal clutch pressure is applied; there is no system intervention of torque control or engine speed control. The system 10 provides the normal clutch pressure to the transmission 70, and the engine speed is determined by throttle input of the vehicle operator, e.g., normal operator control. If the not slipping state is entered from another state (e.g., the slipping state or the max slipping state, further detailed below) in which the clutch pressure has been manipulated and is not at the normal pressure (e.g., at I in FIG. 2 and at P/Q in FIG. 4), then the controller 14 returns the clutch pressure to the normal clutch pressure linearly over time, and, likewise, the engine speed command is relinquished and returned back to normal operator control. The not slipping state is active until wheel slip meets or exceeds the slipping threshold.

To enter the slipping state, at least one or more of the wheels 26 are slipping relative to the support surface 58 at or above the predetermined threshold level of slipping, or slipping threshold. The slipping threshold is programmed into the controller 14, and is a level of slipping desired to require some action to regain traction, and may be zero in some constructions (such that any amount of slipping triggers entrance into the slipping state). Specifically, in the example of FIGS. 2-3, the slipping state is entered at A when time is about 30.2 seconds. In the example of FIG. 4, the slipping state is entered at A when time is about 46.5 seconds. The slipping threshold may be programmed to be any desired value. By way of example only, and not to be regarded as limiting, the wheel slip threshold may be about 5% wheel slip, about 15% wheel slip, about 35% wheel slip, or other desired values generally in a range between about 1% and about 40%, between about 1% and about 100%, or greater than 0% and up to 100%, etc., i.e., any value that is relevant for the application and the way in which wheel slip is measured and quantified. In some constructions, there may be no slipping threshold. The controller 14 continuously compares the measured wheel slip to the slipping threshold to determine whether the fraction control system 10 should be in the slipping state. If the measured wheel slip is at or above the slipping threshold, the system 10 moves to the slipping state (e.g., from the not slipping state to the slipping state).

During the slipping state, the system 10 controls clutch pressure to regulate transmission torque in response to the slipping of the wheel(s) 26. Once the slipping state is entered (as shown at A in FIGS. 2-4), the system 10 immediately drops the clutch pressure by an initial pressure drop to a reduced clutch pressure lower than the normal clutch pressure (as shown in FIG. 2 and at B in FIG. 3). The reduced clutch pressure is estimated as a function of current engine torque at that point in time, of a clutch pressure that is estimated to be close to causing clutch slip. For example, the following formula may be used to provide a clutch command for the reduced clutch pressure:

$$\text{Estimated Clutch Command} = \frac{\text{Torque reported by the engine} * \text{engine to clutch ratio}}{\text{Torque per clutch command}}$$

The "torque per clutch command" value represents how much torque the clutch will transmit with a given clutch command. For example, if current (in milliamps) is sent to the proportional valve, the valve converts the current into hydraulic pressure, which is converted by the clutch into rotational torque. In this way, a given amount of current provides a given amount of torque. Thus, "torque per clutch command" is the torque output resulting from a given current input to the clutch valve. Thus, the reduced clutch pressure may be proportional to the prime mover 34 output torque. The reduced clutch pressure may also be estimated or chosen in other ways. As a general rule, the reduced clutch pressure is sought to approximate the clutch pressure that initially causes clutch slip. The system 10 continuously monitors the clutch slip speed (e.g., in terms of the clutch delta, the clutch slip percentage, or other relative terms) during the slipping state. If the clutch 22 has not slipped, the system 10 reduces the clutch pressure by a step down, pauses, and repeats (as best shown at C in FIG. 3). For example, compared to the initial clutch pressure drop, the step down may be about 3-4% of the initial clutch pressure drop. In other constructions, the step down may be less than about 2%, less than about 1%, less than about 5%, less than about 10%, less than about 50%, or another relatively small amount expected to initiate clutch slip without largely overstepping the boundary of initiating clutch slip. For example, if the initial clutch pressure drop is smaller, then a larger (but still relatively small) step down may be chosen than illustrated in FIG. 3. Each step down may be the same as the previous step down or varied, e.g., decreasing steps down such that each subsequent step down is smaller than the previous step down. As long as the system 10 is in the (wheel) slipping state, this process of stepping down continues until some clutch slip is detected or a minimum clutch pressure limit is reached.

If clutch slip is detected (as shown at D in FIG. 3), a clutch slip speed is monitored. If the clutch slip speed is at or greater than an upper threshold, the system 10 increases the clutch pressure (e.g., the clutch pressure is stepped up) as shown at E in FIG. 3 to reduce the clutch slip. (The corresponding reduction in wheel slip is shown at F in FIG. 3.) The clutch pressure is stepped up to an intermediate clutch pressure by a relatively small amount compared to the initial clutch pressure drop, such as about 15-20% of the initial clutch pressure drop, or more specifically, about 17-19% of the initial clutch pressure drop. In other constructions, the step up may be in the range of about 10-20% of the initial clutch pressure drop, about 5-25%, about 15%-40%, or other values expected to effectively reduce clutch slip without returning to the normal clutch pressure, i.e., other values less than the normal clutch pressure. If clutch slip is at or lower than a lower threshold (which is lower than the upper threshold such as to apply hysteresis), then clutch pressure is stepped down to the previous lowest clutch pressure (i.e., about the same amount as the step up described above, shown as the lowered clutch pressure in FIG. 2) to provide additional clutch slip (as shown at G in FIG. 3). Monitoring of the clutch slip speed continues and the system 10 repeats the step up to the intermediate clutch pressure every time the clutch slip speed is at or greater than the upper threshold, and repeats the step down to the lowered clutch pressure every time the clutch slip is at or lower than the lower threshold, repeatedly. Thus, the clutch pressure is alternated between a clutch pressure that increases clutch slip and a clutch pressure that decreases clutch slip. This step-up/step-down action of clutch pressure creates a dithering (or alternating) effect on the clutch slip (which may be referred to herein as clutch dithering or alternating, clutch slip dithering or alternating, transmission dithering or alternating, transmission output dithering or alternating, transmission speed dithering or alternating, or transmission output torque dithering or alternating). The clutch slip dithering oscillates or vacillates the clutch pressure between higher and lower amplitudes repeatedly, which vacillates the clutch slip and therefore the transmission output speed, which ultimately is a torque modulating condition that reduces wheel slip in a manner proportional to clutch slip. The higher and lower amplitudes (i.e., the intermediate clutch pressure and the lowered clutch pressure) may be repeatedly the same higher and lower amplitudes (as shown in FIGS. 2-4), or the pressure may vacillate between varied higher and lower amplitudes in other constructions. As a result of clutch dithering, for example, a 5% increase in clutch slip can cause a 5% wheel slip reduction.

As such, the controller is operable to monitor clutch slip, lower the clutch pressure from a normal operating pressure to a lower pressure until clutch slip is detected (stepping down the clutch pressure if necessary), then raise the clutch pressure to the intermediate pressure between the normal operating pressure and the lower pressure (and typically closer to the lower pressure) when clutch slip is detected, then lower the clutch pressure back to the lowered clutch pressure when clutch slip speed is lowered, and repeat until the slipping state is exited.

Engine speed may additionally be controlled during the slipping state when the clutch slip speed exceeds a minimum threshold value (which may be higher than the upper and lower thresholds in some constructions but is not necessarily higher). Simultaneously to the transmission torque dithering described above, if clutch slip speed exceeds the minimum threshold, the system 10 modulates the engine speed. Lowering the engine speed (which translates directly to lowering the transmission input side 74 speed) lowers wheel slip and also tends to lower clutch slip. During engine speed modulation, the system 10 targets a lower clutch slip speed by lowering the engine speed. For example, the system 10 may target an engine speed proportional to and lower than the operator's inputted engine speed (or, alternatively, proportional to the ground speed). Over time, as the transmission torque is modulated, this engine speed modulation will result in both the transmission input side 74 speed and the transmission output side 78 speed decreasing, thus further reducing wheel slip. The engine speed, however, need not be modulated in the slipping state. For example, in some constructions, only the transmission torque modulation (clutch slip dithering) is applied during the slipping state. The slipping state is active until wheel slip reaches the exit slipping level, wheel slip reaches the max slipping threshold, or the clutch temperature exceeds the temperature limit.

To leave the slipping state and enter the not slipping state, a hysteresis is applied such that the wheel slip must decrease to at or below an exit slipping level that is lower than the slipping threshold, thereby reducing rapid switching between the slipping and not slipping states. For example, in the illustrated construction of FIGS. 2-4, the exit slipping level may be programmed to be any desired value, e.g., in the range between about 2% and about 20%, or to be at or below another value that is lower than the slipping threshold, or another value that is relevant for the application and the way in which wheel slip is measured and calculated. In FIGS. 2-3, the system 10 exits the slipping state to the not slipping state at I (FIG. 2) at about 40.3 seconds. When the system 10 is in the slipping state, the controller 14 continuously compares the measured wheel slip to the exit slipping level to determine whether the traction control system 10 should exit the slipping state. If the measured wheel slip is at or below the exit slipping level, the system 10 moves from the slipping state to the not slipping state. In this example, hysteresis reduces rapid switching between the slipping and the not slipping states. In other constructions, the system 10 may leave the slipping state when the wheel slip reaches at or below the slipping threshold, thus without hysteresis.

In summary and with reference to the example of FIGS. 2-3, at A the wheel slip crosses the slipping threshold. At B the clutch pressure drops to a value determined based on engine torque. At C, the controller 14 looks for clutch slip, steps down the clutch pressure by a relatively small amount, pauses, looks for clutch slip and repeats several times resulting in a down-stepping of clutch pressure by a relatively small amount or step. At D, clutch slip is detected. At E, clutch pressure steps up due to the increased clutch slip. At F, the wheel slip is shown to drop as a result of clutch slip. At G, the clutch pressure steps down to the previous lowest clutch pressure due to decreased clutch slip. At H, the engine speed tracks transmission output speed, thereby reducing wheel slip in addition to the clutch dithering. At I (FIG. 2), wheel slip drops below the exit wheel slip level and the system 10 returns the clutch pressure to the normal clutch pressure.

To enter the max slipping state, or maximum slipping state, the wheel slip is at or above a predetermined threshold level of maximum slipping, or max slipping threshold. The max slipping threshold is programmed into the controller 14 and is a level of slipping that requires additional actions, or different actions, to regain traction. For example, the max slipping threshold may be programmed to be any desired value, e.g., between about 30% and about 60%, etc., or to be at or above another value that is higher than the slipping threshold, or another value that is relevant for the application and the way in which wheel slip is measured and quantified. As shown in FIG. 4, the max slipping state is entered at J at about 47.5 seconds. The controller 14 continuously compares the measured wheel slip to the max slipping threshold to determine whether the traction control system 10 is in the max slipping state. If the measured wheel slip is at or above the max slipping threshold, the system 10 moves from the slipping state to the max slipping state.

The max slipping state may also be entered when the clutch 22 reaches a limit of its thermal energy capability, e.g., overheats. For example, a clutch temperature sensor measures clutch temperature and sends a clutch temperature signal to the controller 14. The controller 14 continuously monitors the clutch temperature and if the clutch temperature exceeds a predetermined temperature value, then the system 10 enters the max slipping state.

During the max slipping state (FIG. 4), only engine speed is controlled. The controller 14 commands the clutch 22 to return to the normal clutch pressure (thus normal transmission torque) linearly over time and commands the prime mover 34 to maintain an engine speed that is lower than but proportional to the operator's requested engine speed (or, alternatively, lower than but proportional to the ground speed). Thus, wheel slip is reduced by reducing the speed of input to the wheels 26. The max slipping state is active until the wheel slip reaches (at or below) the max slipping threshold.

To leave the max slipping state and enter the slipping state when the measured wheel slip is at or above the max slipping threshold, the wheel slip must decrease below the max slipping threshold. The controller 14 continuously compares the measured wheel slip to the max slipping threshold to determine whether the traction control system 10 is in the max slipping state. If the measured wheel slip is at or below the max slipping threshold, the system 10 moves from the max slipping state to the slipping state. As shown in FIG. 4, the system 10 exits the max slipping state when the wheel slip drops below the max slipping threshold at N and simultaneously returns to the slipping state at O. In other constructions, the system 10 may exit the max slipping state to the slipping state only when the wheel slip is below the max slipping threshold. In yet other constructions, a hysteresis may be applied such that the system 10 exits the max slipping state to the slipping state when the wheel slip decreases to an exit max slipping level that is lower than the max slipping threshold. In this example, hysteresis would reduce rapid switching between the max slipping and the slipping states. If a max slipping state has been entered based on clutch temperature, the system 10 may exit the max slipping state to the slipping state when the clutch temperature drops to at or below the predetermined temperature value if the measured wheel slip is not at or above the max slipping threshold. Entering the not slipping state from the slipping state is as previously described.

In summary and with reference to the example shown in FIG. 4, at A the system 10 enters the slipping state when the wheel slip crosses the slipping threshold. It can be seen that the clutch pressure is dithered, as described above, during the slipping state in FIG. 4. At K, the system 10 enters the max slipping state when the wheel slip crosses the max slipping threshold at J. At L, during the max slipping state, the clutch pressure is ramped up linearly over time to the normal clutch pressure, ending clutch dithering. During the max slipping state (generally at M), only the engine speed is controlled as discussed above. At N, the wheel slip drops below the max slipping threshold and the system 10 returns to the slipping state at O, during which the clutch pressure can be seen to take the initial drop, step down in small amounts, and dithering occurs when clutch slip is detected. Finally, when the wheel slip drops below the wheel slip exit level at P, returning to the not slipping state at Q, the controller 14 returns the transmission torque to normal by ramping the clutch pressure back up to the normal clutch pressure linearly over time.

Thus, the disclosure provides, among other things, a system 10 and method for automatically dithering the transmission torque as a form of torque regulation for reducing wheel slip. The system 10 may also automatically control engine speed simultaneously with the clutch dithering to collectively reduce wheel slip. The system 10 of the present disclosure generally operates by detecting wheel slip and then regulating a friction element in the transmission 70 to limit the torque capable of being transmitted through the transmission 70, thereby limiting and regulating wheel torque, thus reducing wheel spin or slip. The disclosure also provides a system 10 and method for automatically reacting to wheel slip by transmission dithering, e.g., alternating the clutch pressure between higher and lower amplitudes repeatedly as a function of a measured level of clutch slip. The disclosure also provides a system 10 and method for automatically reacting to wheel slip by torque control (clutch dithering) when wheel slip exceeds a first threshold level, by torque control and speed control (engine speed modulation) when clutch slip exceeds a minimum threshold, and by engine speed control only when wheel slip exceeds a second threshold level larger than the first threshold level. Various features and advantages of the disclosure are set forth in the following claims.

What is claimed is:

1. A vehicle traction control system for a vehicle having a prime mover, at least one wheel for providing tractive effort on a support surface, and a transmission having an input side operably coupled to the prime mover and an output side operably coupled to the at least one wheel, the transmission having a controllable clutch pressure between the input side and the output side, the traction control system comprising:

a controller operable to monitor wheel slip of the at least one wheel, wherein in response to a detected wheel slip the controller is operable to control the clutch pressure of the transmission for reducing the wheel slip; and wherein the controller is operable to monitor clutch slip and lower the clutch pressure from a normal operating pressure to a lower pressure until clutch slip is detected.

2. The vehicle traction control system of claim 1, wherein the controller is operable to control the clutch pressure by alternating the clutch pressure between higher and lower amplitudes repeatedly.

3. The vehicle traction control system of claim 1, wherein the controller is operable to lower the clutch pressure for modulating the output torque of the transmission.

4. The vehicle traction control system of claim 1, wherein the controller is operable to control the clutch pressure as a function of the clutch slip.

5. The vehicle traction control system of claim 1, wherein the controller is further operable to raise the clutch pressure to an intermediate pressure between the normal operating pressure and the lower pressure in response to the detected clutch slip.

6. The vehicle traction control system of claim 5, wherein the controller repeats lowering the clutch pressure and raising the clutch pressure as a form of torque output modulation for reducing wheel slip.

7. The vehicle traction control system of claim 1, wherein the controller is operable to modulate engine speed for further reducing wheel slip in response to the clutch slip exceeding a predetermined level.

8. The vehicle traction control system of claim 1, wherein in response to wheel slip reaching a first threshold level the controller is operable to control the clutch pressure for modulating an output torque of the transmission for reducing the wheel slip, and wherein in response to wheel slip reaching a second threshold level greater than the first threshold level the controller is operable to terminate clutch pressure control and control the engine speed for reducing wheel slip.

9. The vehicle traction control system of claim 1, wherein the controller is operable to control the clutch pressure by dithering the clutch pressure between higher and lower amplitudes repeatedly based on an amount of clutch slip.

10. A method of regulating wheel slip in a traction vehicle having a prime mover, at least one wheel for providing tractive effort on a support surface, and a transmission having an input side operably coupled to the prime mover and an output side operably coupled to the at least one wheel, the transmission having a controllable clutch pressure between the input side and the output side, the method comprising:

monitoring wheel slip of the at least one wheel;

controlling the clutch pressure of the transmission in response to a detected wheel slip to reduce the wheel slip;

monitoring clutch slip; and controlling the clutch pressure as a function of the clutch slip.

11. The method of claim 10, further comprising controlling the clutch pressure by alternating the clutch pressure between higher and lower amplitudes repeatedly.

12. The method of claim 10, further comprising lowering the clutch pressure for modulating the output torque of the transmission.

13. The method of claim 10, further comprising lowering the clutch pressure from a normal operating pressure to a lower pressure until clutch slip is detected.

14. The method of claim 13, further comprising raising the clutch pressure to an intermediate pressure between the normal operating pressure and the lower pressure in response to the detected clutch slip.

15. The method of claim 10, further comprising repeating lowering the clutch pressure and raising the clutch pressure as a form of torque output modulation for reducing wheel slip.

16. The method of claim 10, further comprising:

modulating engine speed for further reducing wheel slip in response to the clutch slip exceeding a predetermined level.

17. The method of claim 10, further comprising:

controlling the clutch pressure for reducing the wheel slip in response to wheel slip reaching a first threshold level; and terminating clutch pressure control and controlling the engine speed for reducing wheel slip in response to wheel slip reaching a second threshold level greater than the first threshold level.

18. The method of claim 10, further comprising controlling the clutch pressure by dithering the clutch pressure between higher and lower amplitudes repeatedly based on an amount of clutch slip.

19. A vehicle traction control system for a vehicle having a prime mover, at least one wheel for providing tractive effort on a support surface, and a transmission having an input side operably coupled to the prime mover and an output side operably coupled to the at least one wheel, the transmission having a controllable clutch pressure between the input side and the output side, the traction control system comprising a processor configured to:

monitor wheel slip of the at least one wheel;

in response to the wheel slip being at or above a first threshold and below a second threshold, reduce the clutch pressure for reducing the wheel slip;

in response to the wheel slip being at or above the second threshold, control the engine speed for reducing the wheel slip;

monitor clutch slip; and alternate the clutch pressure between higher and lower amplitudes repeatedly as a function of the clutch slip when the wheel slip is at or above the first threshold and below the second threshold after reducing the clutch pressure.

* * * * *